United States Patent [19]
Girardey

[11] Patent Number: 5,788,058
[45] Date of Patent: Aug. 4, 1998

[54] AC TORQUE VECTOR WINCH

[75] Inventor: Gregory F. Girardey, Jasper, Ala.

[73] Assignee: Continental Conveyor & Equipment Co. L.P., Winfield, Ala.

[21] Appl. No.: 767,630

[22] Filed: Dec. 17, 1996

Related U.S. Application Data

[60] Provisional application No. 60/022,025 Jul. 22, 1996.

[51] Int. Cl.$^6$ ................................................ B65G 23/44
[52] U.S. Cl. ............................................................ 198/813
[58] Field of Search ...................................... 198/812, 813

[56] References Cited

U.S. PATENT DOCUMENTS

| | | |
|---|---|---|
| 2,862,604 | 12/1958 | Graggs et al. .......................... 198/812 |
| 3,015,473 | 1/1962 | Frellsen ................................. 198/813 |
| 3,027,993 | 4/1962 | Houben .................................. 198/813 |
| 3,537,573 | 11/1970 | Tangye, Jr. . |
| 3,675,482 | 7/1972 | Hewitt . |
| 3,923,151 | 12/1975 | Weber . |
| 4,037,876 | 7/1977 | Georg et al. . |
| 4,090,601 | 5/1978 | Freed, Jr. . |
| 4,284,192 | 8/1981 | Taylor . |
| 4,508,213 | 4/1985 | Kelley . |
| 4,653,634 | 3/1987 | Hansen . |
| 4,803,804 | 2/1989 | Bryant . |
| 5,131,528 | 7/1992 | Bandy, Jr. . |

*Primary Examiner*—Joseph E. Valenza
*Attorney, Agent, or Firm*—Pearne, Gordon, McCoy & Granger LLP

[57] ABSTRACT

A conveyor belt tensioning assembly having a winch drum and a pair of ac torque vector motors operatively connected to the winch drum. The motors are controlled by a motor controller which senses operational load on the winch drum and adjusts operating parameters of the motors to maintain belt tension within a desired range.

20 Claims, 5 Drawing Sheets

5,788,058

AC TORQUE VECTOR WINCH

BACKGROUND OF THE INVENTION

Endless conveyors and mobile or advancing conveyors used in mining and various other applications employ a tensioning device to maintain the conveyor belt at a constant or predetermined tension. In the past, such tension has typically been provided by a hydraulic winch. The hydraulic winches are used on a conveyor take-up or storage unit and apply a constant pull on the conveyor carriage which, in turn, regulates tension applied to the conveyor belt to insure traction at the main drive. When a slack belt is absorbed by the take-up, the winch winds or pays in, if tension becomes too great, the winch unwinds or pays out. Devices of this type are well known in the art, as illustrated by U.S. Pat. Nos. 3,537,573; 3,675,482; 3,923,151; 4,037,876; 4,090,601; 4,508,213; 4,653,634; 4,803,804; and, 5,131,528, the disclosures of which are expressly incorporated herein in their entireties.

Unfortunately, hydraulic units require excessive maintenance, such as changing filters, oil and replacing pressure worn components. Hydraulic units also require a large number of moving parts, and run in an open loop constant pressure mode.

Therefore, there exists a need in the art for an improved tensioning winch which removes at least some of the aforementioned disadvantages of the tensioning devices known in the art.

SUMMARY OF THE INVENTION

The present invention is directed toward a conveyor tensioning system which eliminates at least some of the deficiencies present in hydraulic belt tensioning systems. The present invention is also directed toward an assembly which can utilize either hydraulic or electric brakes.

In accordance with one embodiment of the present invention, the tensioning assembly includes a winch drum having a torque hub or planetary gearbox mounted within each end thereof, hydraulic brakes mounted to each gearbox, and a pair of drum input shafts extending from the brakes and operatively interconnected with the drum. Each of the input shafts includes a sprocket which is drivably connected to a chain-type drive belt.

In further accordance with the present invention, a pair of motors are located relatively behind the winch drum and include output shafts. Each of the output shafts includes a sprocket which is rotatably connected to an associated input shaft of the winch drum via the drive belt.

In further accordance with the present invention, the motors are ac vector motors in which torque changes rapidly to accommodate changing load conditions during conveyor operation. The motors do not have a transient torque response, but rather have a torque response which tracks the load-required torque to more accurately control operation of the winch in response to variable load conditions.

BRIEF DESCRIPTION OF THE DRAWING FIGURES

These and further features of the present invention will be apparent with reference to the following description and drawings, wherein.

DETAILED DESCRIPTION OF THE PREFERRED EMBODIMENT

Figure 1:
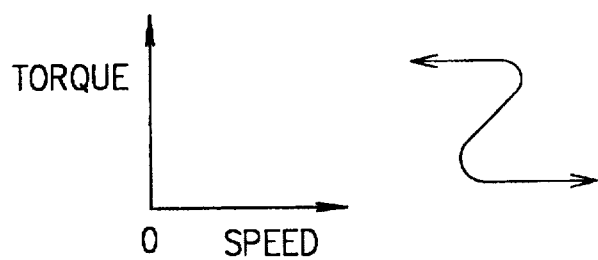
FIG. 1 is a graph of a typical curve of torque versus speed for a variable frequency electric motor.

It should be noted that in the detailed description which follows, identical components have the same reference numeral, regardless of whether they are shown in different embodiments of the present invention. It should also be noted that, in order to clearly and concisely disclose the present invention, the drawings may not necessarily be to scale and certain features of the invention may be shown in somewhat schematic form.

Figure 7:
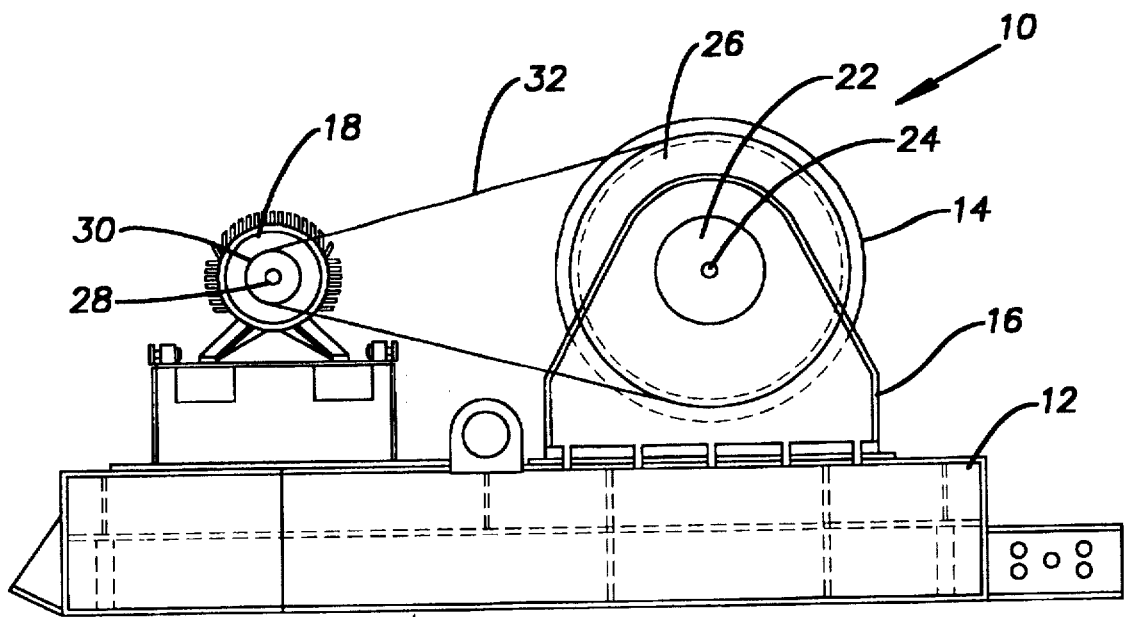
FIG. 7 is a side elevational view of the vector tensioning winch shown in FIG. 6.
Figure 6:
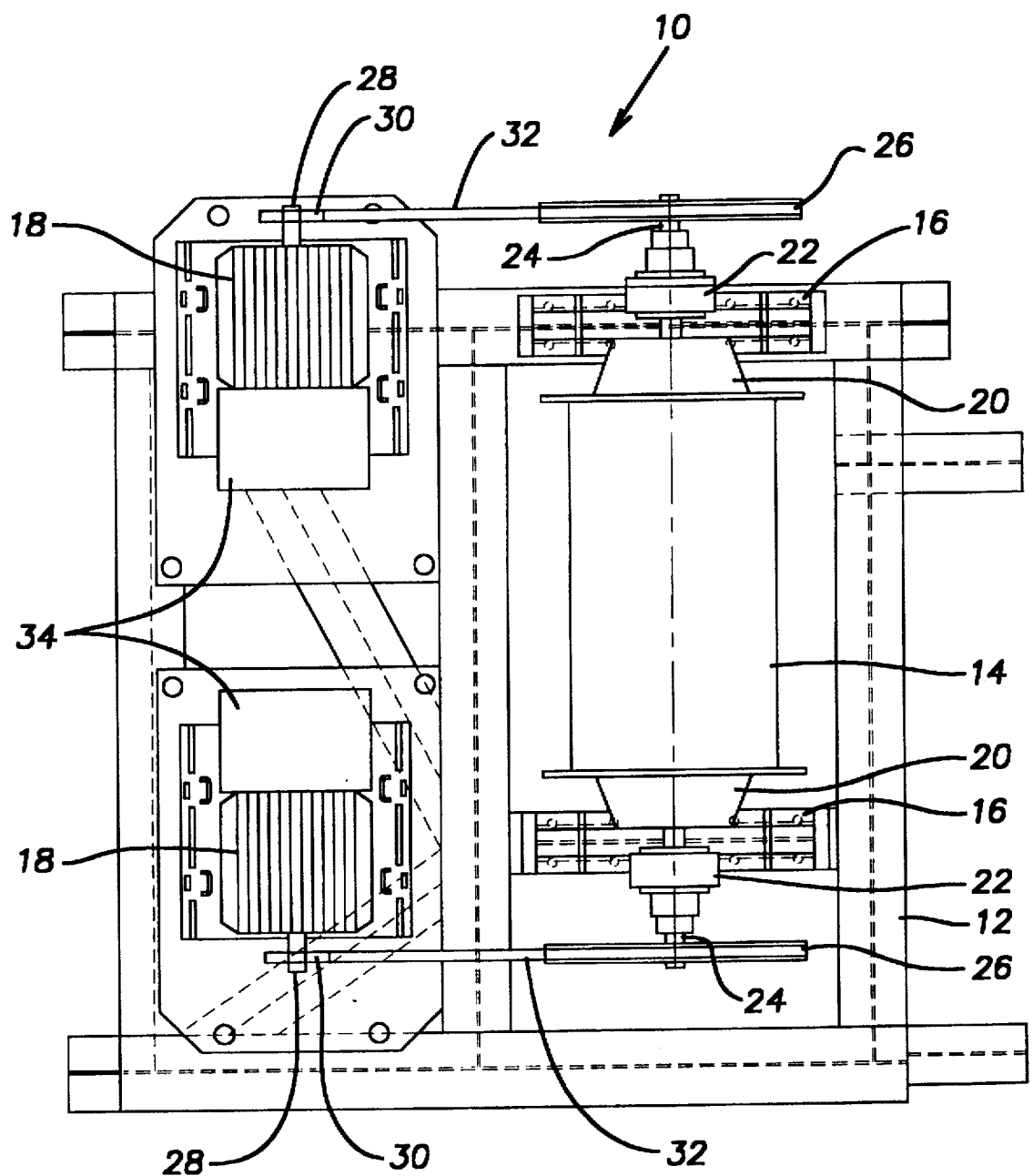
FIG. 6 is a top plan view of a vector tensioning winch according to the first embodiment of the present invention.

With reference to FIGS. 6 and 7, an AC torque vector winch assembly 10 according to a first embodiment of the present invention is illustrated. The assembly 10 comprises a winch base 12, winch drum 14, a pair of supporting end brackets 16, and a pair of ac torque vector motors 18. Each end of the drum 14 has a planetary gearbox 20 therein. Each planetary gearbox 20 has a failsafe brake 22 inserted therein. The failsafe brakes 22 are secured to an associated end bracket 16 which, in turn, supports the end of the winch drum 14, as illustrated. An input or adaptor shaft 24 extends from each brake 22, and has a first sprocket 26 secured to a free end thereof.

The vector motors 18 are located relatively behind the winch drum 24. Each of the vector motors 18 has an output shaft 28 that is generally parallel to the adaptor or input shaft 24 extending from the winch drum 14. The output shafts 28 of the vector motors 18 are spaced a distance above the winch base 12 which is generally identical to the distance that the adaptor or input shafts 24 are spaced above the winch base 12, as illustrated.

Each output shaft 28 has a second sprocket 30 secured thereto. Each of the second sprockets 30 is generally inline with an associated first sprocket 26, and is connected to the first sprocket 26 by a polychain-type drive belt 32. Each of the motors 18 includes a motor controller 34 that controls operation of the motor 18 to maintain proper tension on the conveyor belt (not shown) by means of the winch drum 14. As is well known in the art, rotation of the winch drum 14 pays in or pays out a cable (not shown) which is connected to a conveyor carriage (not shown) and thereby adjusts the tension on the conveyor belt carried by the carriage.

Figure 8:
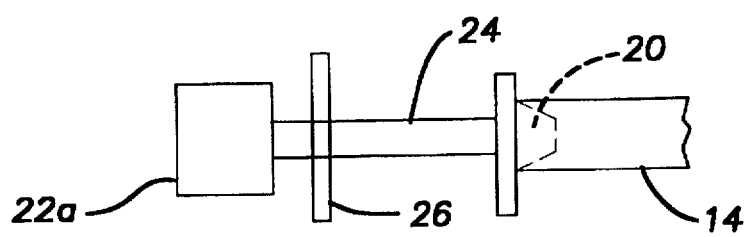
FIG. 8 is a schematic illustration of a drive mechanism using the torque vector winch according to a second embodiment of the present invention.
Figure 9:
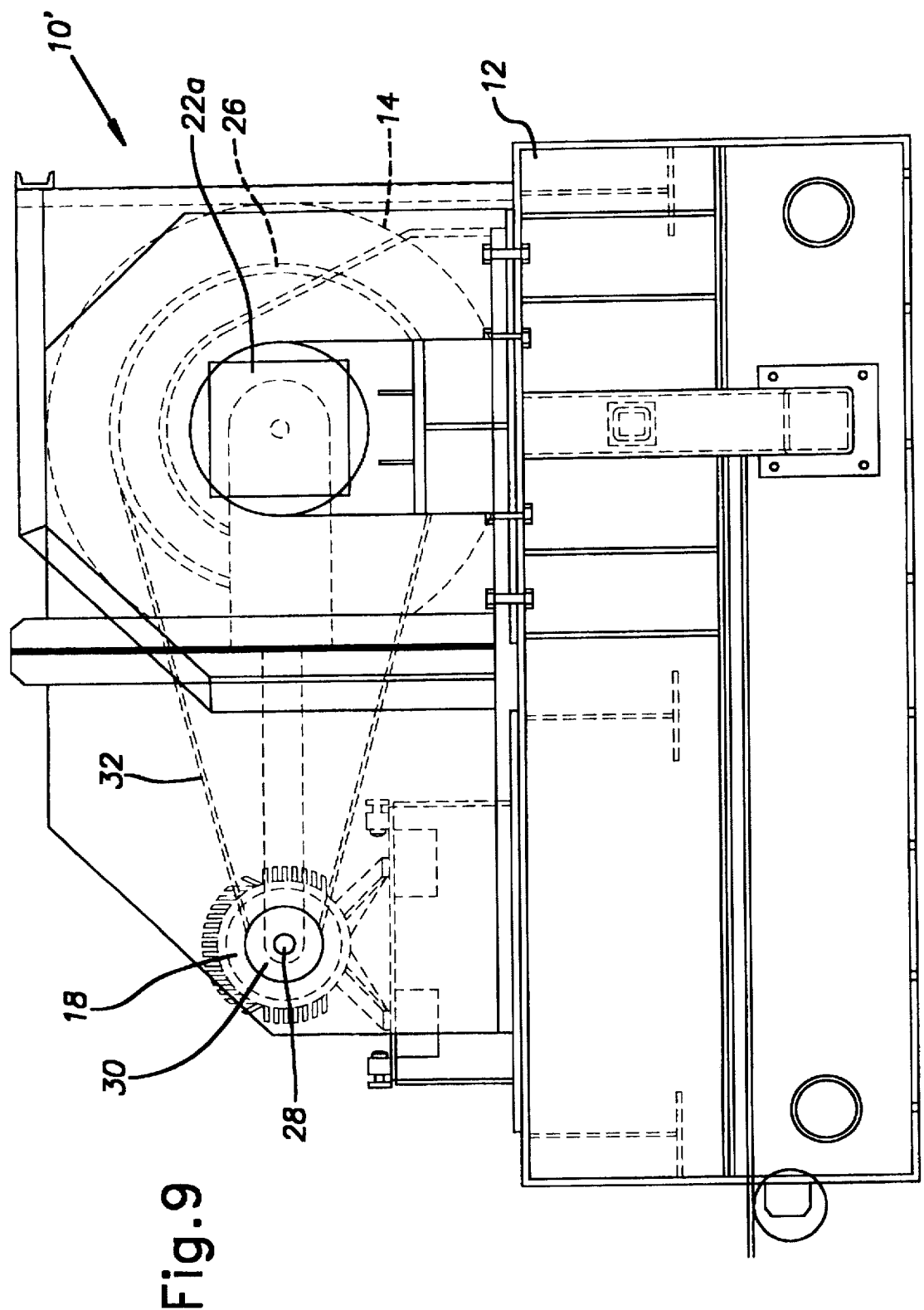
FIG. 9 is a top plan view of a vector tensioning winch according to the second embodiment of the present invention.
Figure 10:
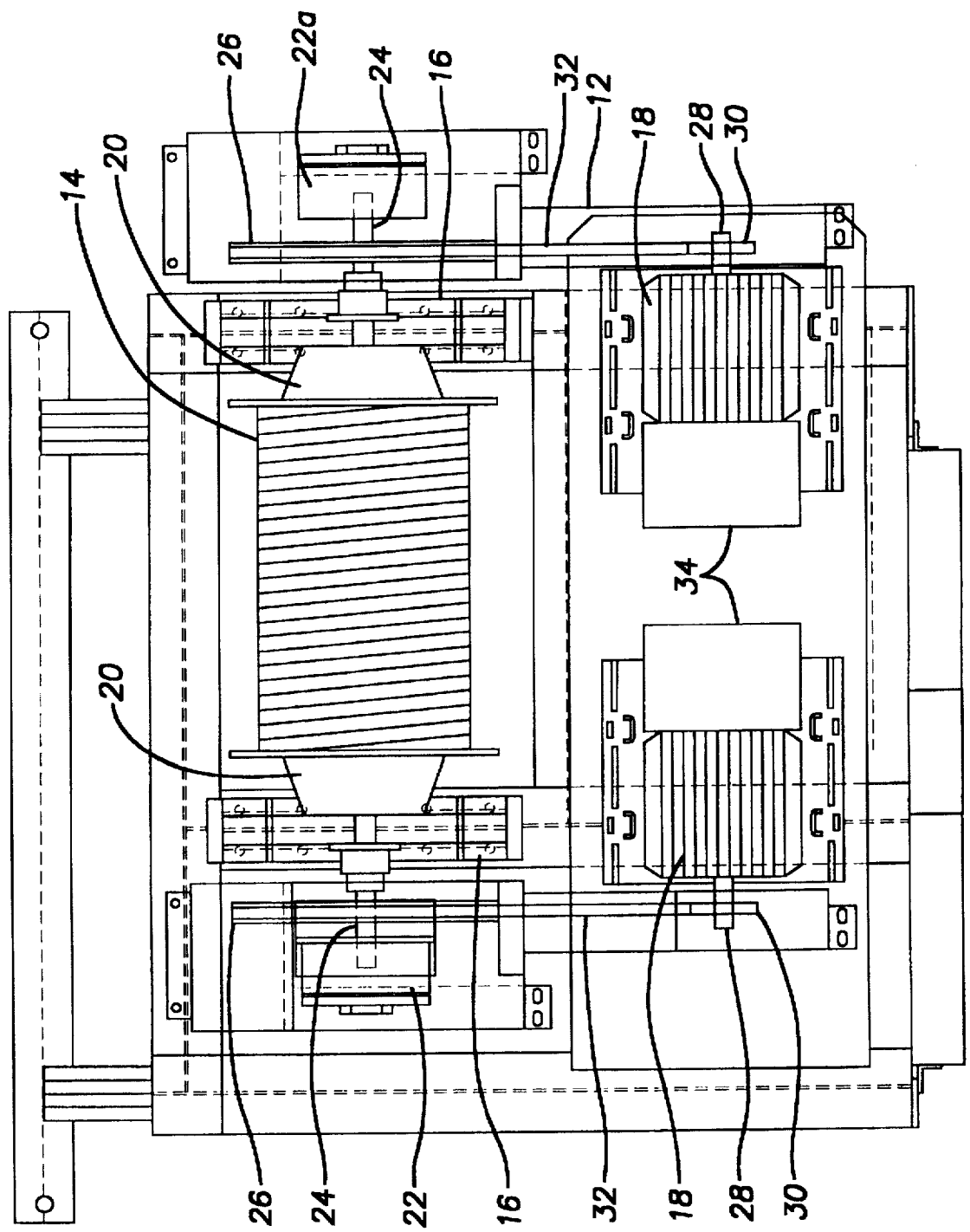
FIG. 10 is a side elevational view of the vector tensioning winch shown in FIG. 9.

With reference to FIGS. 8–10, an assembly 10' according to a second embodiment of the present invention is illustrated. As noted hereinbefore, structural components common to the first and second embodiments have been given the same reference numeral in the drawings and description for purposes of clarity.

The assembly 10' comprises a winch base 12, winch drum 14, a pair of supporting end brackets 16, and a pair of ac torque vector motors 18. Each end of the drum 14 has a planetary gearbox 20 therein. Each planetary gearbox 20 has an input or adaptor shaft 24 inserted therein. The input or adaptor shaft 24 extends from each gearbox 22, through a first sprocket 26, and has a free end thereof secured to an electric brake 22a. As such, the electric brakes 22a are laterally outboard of the first sprockets 26, and directly engage and the input shaft 24 which, in turn, is directly engaged with the gearbox 20 that is rigidly attached to the winch drum 14 for mutual or common rotation therewith.

As in the first embodiment, the vector motors 18 are located relatively behind the winch drum 24. Each of the vector motors 18 has an output shaft 28 that is generally parallel to the adaptor or input shaft 24 extending from the winch drum 14. The output shafts 28 of the vector motors 18 are spaced a distance above the winch base 12 which is generally identical to the distance that the adaptor or input shafts 24 are spaced above the winch base 12, as illustrated.

Each output shaft 28 has a second sprocket 30 secured thereto. Each of the second sprockets 30 is generally inline with an associated first sprocket 26, and is connected to the first sprocket 26 by a polychain-type drive belt 32. Each of the motors 18 includes a motor controller 34 that controls operation of the motor 18 to maintain proper tension on the conveyor belt (not shown) by means of the winch drum 14. As is well known in the art, rotation of the winch drum 14 pays in or pays out a cable (not shown) which is connected to a conveyor carriage (not shown) and thereby adjusts the tension on the conveyor belt carried by the carriage. Whereas prior art hydraulic winches operate in an open-loop, constant pressure mode, the electric vector motor winch according to the present invention operates in a closed loop, tension feedback mode. Sensors, such as Kistler Morse load cells, correlate winch line pull to actual operating conveyor belt tension, and this is used by the motor controller to operate the vector motors and thereby rotate the winch drum 14 to maintain the pull line, and hence the conveyor belt tension, within desired operating parameters.

One type of vector motor successfully used, is manufactured by BALDOR, Model No. ZDM4316T, (further identified as 75 HP, 1780 RPM, 460 VAC, three phase, 60 Hz 365 T-frame). It is submitted that various other vector motors are known in the art and may be used with equal functionality.

Figure 2:
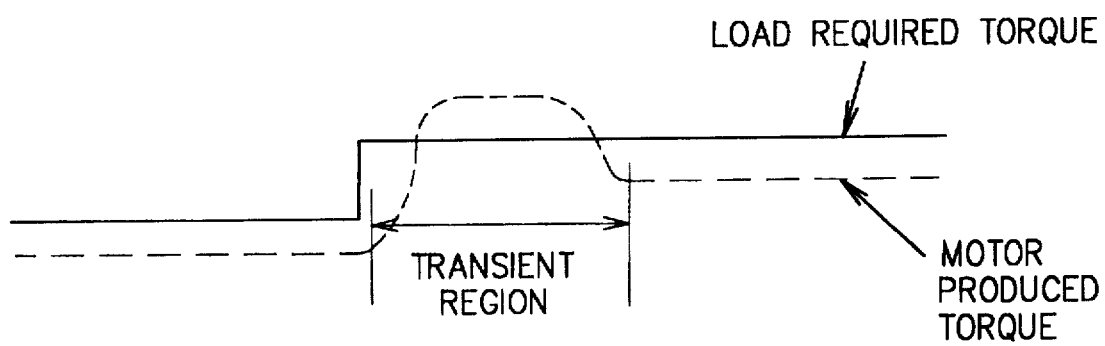
FIG. 2 is a graph of the torque response of a variable frequency electric motor.

With reference to FIGS. 1 and 2, graphs of the operational response of a variable frequency control motor are illustrated. With reference to FIG. 1, it is shown that the torque of the motor is variable, and depends upon the speed at which the motor is operated. A variable frequency controlled motor also has a dead zone which from zero rpm to some minimum frequency. Typically, frequency control has a transient region, shown in both FIGS. 1 and 2, wherein the motor produced torque does not follow the load required torque. As such, variable frequency controlled motors have not been suitable for conveyor tensioning applications wherein the required and motor-provided torque must correspond to one another.

Figure 3:
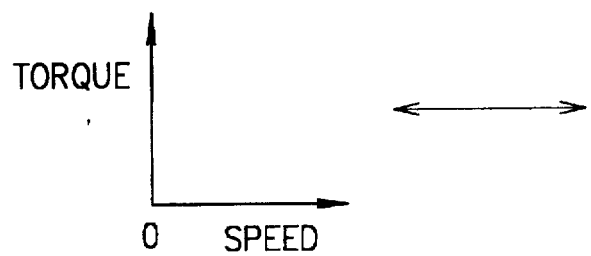
FIG. 3 is a graph of the torque versus speed of a motor having flux vector control.
Figure 4:
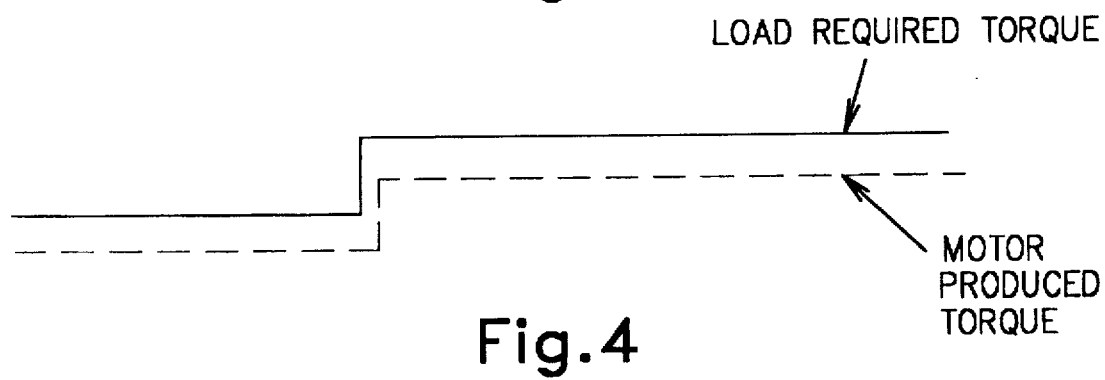
FIG. 4 is a graph of the torque response of a motor having flux vector control.
Figure 5:
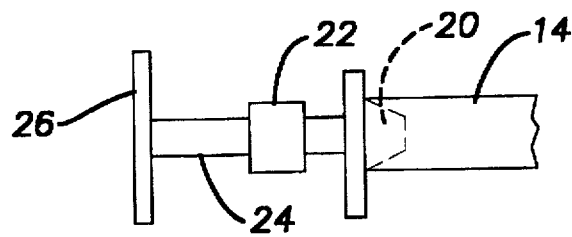
FIG. 5 is a schematic illustration of a drive mechanism using the torque vector winch according to a first embodiment of the present invention.

Contrarily, as shown in FIGS. 3 and 4, a vector motor 18 as used in the present invention provides constant torque at a range of rotational speeds, including zero rpm. As such, the torque provided by the vector motors used in the present invention can track or follow the required torque, which corresponds to the conveyor load, as the conveyor load/tension varies, and provides steady-state control of the tension on the winch.

The vector motor controller 34 preferably has sixteen bit resolution that can process approximately 3000 calculations per second, and constantly samples and updates control parameters, such as torque, frequency, phase angle, etc. Generally speaking, the primary current $I_1$ is divided into two components, the magnetizing current $I_m$ which is magnetizing flux, and the torque-producing current $I_T$ which is converted into rotor torque ($I^1=I_M+I_T$). With vector control, torque response is rapid, and there is no transient and, therefore, vector motors do not suffer from the disadvantages inherent in variable frequency controlled motors mentioned hereinbefore.

The primary current, the torque current, the magnetizing current, and the angle between the torque and magnetizing currents are constantly monitored and controlled by the motor controller 34 in response to sensed load/torque to provide the necessary output torque, and thereby provides rapid or almost immediate variation in the operating parameters of the motors which follow the tension requirements of the conveyor belt during use, and maintain the belt tension within a predetermined desired operating range.

AC induction motors generally conform to the following equations:

$$S=(N_S-N_R)/N_S$$

$$N_S=((120-f)/(P/N_S))(1-S)\alpha T$$

$$S \alpha T$$

$$I_1=I_M+I_T$$

wherein $N_S$ is stator speed, $N_R$ is rotor speed, S is slip, P is load, f is frequency, and T is torque.

In vector motors, when the load increases, the primary current increases, the magnetizing current remains constant the torque current increases, and the slip frequency ($W_S$) increases. Therefore, when more torque is required, the motor controller provides increased torque current to thereby increase the torque output at the rotor or motor output shaft. Conversely, when less torque is required, the motor controller provides decreased torque current to thereby decrease the torque output at the motor output shaft 28.

In the assembly according to the present invention, the load on the motor is directly related to the load on the winch which, in turn, is equivalent to the tension on the conveyor belt. As the tension on the conveyor belt varies during use, the load on the motor, and the torque current and the motor produced torque varies accordingly, as shown in FIG. 4.

The preferred embodiment of the present invention has been described in the foregoing, but is not limited thereto. Rather, the present invention is only defined by the claims appended hereto.

What is claimed is:

1. A conveyor belt tensioning assembly, comprising:
   a winch drum, said drum comprising a cylindrical body having first and second ends;
   first and second planetary gearboxes, said first gearbox being disposed within said first end and said second gearbox being disposed within said second end;
   first and second brakes, said first brake being secured to said first gearbox and said second brake being secured to said second gearbox;
   first and second input shafts, said first input shaft being secured to, and extending outwardly from, said first brake and said second input shaft being secured to, and extending outwardly from, said second brake;

first and second input sprockets, said first input sprocket being secured to a free end of said first input shaft and said second input sprocket being secured to a free end of said second input shaft;

first and second electric motors, said first electric motor including a first output shaft and said second electric motor including a second output shaft, said first output shaft having a first output sprocket secured to a free end thereof and said second output shaft having a second output shaft secured to a free end thereof;

a first drive belt operatively linking said first output shaft to said first input shaft and a second drive belt operatively linking said second output shaft to said second input shaft.

2. A conveyor belt tensioning assembly according to claim 1, wherein said electric motors are ac flux vector motors.

3. A conveyor belt tensioning assembly according to claim 2, wherein each of said ac flux vector motors includes a motor controller, said motor controller monitoring tension on said drive belt and controlling operation of said motor to maintain the drive belt tension within a predetermined range.

4. A conveyor belt tensioning assembly according to claim 3, further comprising a winch base and a pair of winch supporting end brackets, said end brackets being secured to said winch base and extend upwardly therefrom and being operable to support said winch drum above said winch base.

5. A conveyor belt tensioning assembly according to claim 4, wherein each of said input shafts and said output shafts are spaced a predetermined and identical distance above said winch base.

6. A conveyor belt tensioning assembly according to claim 5, wherein each of said motors is mounted upon a platform, said platform being secured to said winch base.

7. A conveyor belt tensioning assembly according to claim 2, wherein said second sprockets are relatively smaller in diameter than said first sprockets.

8. A conveyor belt tensioning assembly, comprising:

a winch drum, said drum comprising a cylindrical body having first and second ends;

a support base disposed relatively beneath said winch drum;

a pair of supporting brackets, each of said supporting brackets being secured to said support base and being operable to support said drum relatively above said base;

first and second planetary gearboxes, said first gearbox being disposed within said drum first end and said second gearbox being disposed within said drum second end;

first and second brakes, said first brake being secured to said first gearbox and said second brake being secured to said second gearbox;

first and second input shafts, said first input shaft being secured to, and extending outwardly from, said first brake and said second input shaft being secured to, and extending outwardly from, said second brake;

first and second input sprockets, said first input sprocket being secured to a free end of said first input shaft and said second input sprocket being secured to a free end of said second input shaft;

first and second ac flux vector motors, said first motor including a first output shaft and said second motor including a second output shaft, said first output shaft having a first output sprocket secured to a free end thereof and said second output shaft having a second output shaft secured to a free end thereof;

a first drive belt operatively linking said first output sprocket to said first input sprocket; and, a second drive belt operatively linking said second output sprocket to said second input sprocket.

9. A conveyor belt tensioning assembly according to claim 8, wherein each of said first and second motors includes a motor controller, said motor controller monitoring tension on an associated drive belt and controlling operation of said motor to maintain the drive belt tension within a predetermined range.

10. A conveyor belt tensioning assembly according to claim 9, wherein each of said input shafts and said output shafts are spaced a predetermined and identical distance above said winch base.

11. A conveyor belt tensioning assembly according to claim 10, wherein each of said motors is mounted upon a platform, said platform being secured to said winch base.

12. A conveyor belt tensioning assembly according to claim 11, wherein said second sprockets are relatively smaller in diameter than said first sprockets.

13. A conveyor belt tensioning assembly, comprising:

a winch drum, said drum comprising a cylindrical body having first and second ends;

first and second planetary gearboxes, said first gearbox being disposed within said first end and said second gearbox being disposed within said second end;

first and second brakes, said first brake being secured to said first gearbox and said second brake being secured to said second gearbox;

first and second input shafts, said first input shaft being secured to, and extending outwardly from said first gearbox and said second input shaft being secured to, and extending outwardly from, said second gearbox;

first and second brakes, said first brake being secured to said first input shaft and said second brake being secured to said second input shaft;

first and second input sprockets, said first input sprocket being secured to said first input shaft intermediate said first brake and said first gearbox and said second input sprocket being secured said second input shaft intermediate said second brake and said second gearbox;

first and second electric motors, said first electric motor including a first output shaft and said second electric motor including a second output shaft, said first output shaft having a first output sprocket secured to a free end thereof and said second output shaft having a second output shaft secured to a free end thereof;

a first drive belt operatively linking said first output shaft to said first input shaft and a second drive belt operatively linking said second output shaft to said second input shaft.

14. A conveyor belt tensioning assembly according to claim 13, wherein said electric motors are ac flux vector motors.

15. A conveyor belt tensioning assembly according to claim 14, wherein each of said ac flux vector motors includes a motor controller, said motor controller monitoring tension on said drive belt and controlling operation of said motor to maintain the drive belt tension within a predetermined range.

16. A conveyor belt tensioning assembly according to claim 15, further comprising a winch base and a pair of winch supporting end brackets, said end brackets being secured to said winch base and extend upwardly therefrom and being operable to support said winch drum above said winch base.

17. A conveyor belt tensioning assembly according to claim 16, wherein each of said input shafts and said output shafts are spaced a predetermined and identical distance above said winch base.

18. A conveyor belt tensioning assembly according to claim 17, wherein each of said motors is mounted upon a platform, said platform being secured to said winch base.

19. A conveyor belt tensioning assembly according to claim 14, wherein said second sprockets are relatively smaller in diameter than said first sprockets.

20. A conveyor belt tensioning assembly according to claim 13, wherein said brakes are electric brakes.

* * * * *